(12) United States Patent
Yoshikawa

(10) Patent No.: US 8,279,368 B2
(45) Date of Patent: Oct. 2, 2012

(54) LIGHTING DEVICE FOR DISPLAY DEVICE, DISPLAY DEVICE AND TELEVISION RECEIVER

(75) Inventor: Takahiro Yoshikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 316 days.

(21) Appl. No.: 12/676,662

(22) PCT Filed: May 2, 2008

(86) PCT No.: PCT/JP2008/058402
§ 371 (c)(1),
(2), (4) Date: Mar. 5, 2010

(87) PCT Pub. No.: WO2009/034743
PCT Pub. Date: Mar. 19, 2009

(65) Prior Publication Data
US 2010/0208144 A1    Aug. 19, 2010

(30) Foreign Application Priority Data
Sep. 14, 2007    (JP) .................................. 2007-239417

(51) Int. Cl.
*G02F 1/1335*    (2006.01)
(52) U.S. Cl. ................ 349/58; 349/62; 349/64; 349/65; 362/97.1; 362/97.2
(58) Field of Classification Search ......................... None
See application file for complete search history.

(56) References Cited

U.S. PATENT DOCUMENTS 6,867,825 B2 * 3/2005 Kanatsu et al. ................ 349/60
2006/0279957 A1 * 12/2006 Kwon et al. .................. 362/378
2009/0154140 A1    6/2009 Aoki et al.

FOREIGN PATENT DOCUMENTS

| CN | 1466003 A | 1/2004 |
| CN | 1945786 A | 4/2007 |
| JP | 2002-082626 A | 3/2002 |
| JP | 2002-311417 A | 10/2002 |
| JP | 2004-030958 A | 1/2004 |
| JP | 2004-287226 A | 10/2004 |
| JP | 2005-158585 A | 6/2005 |
| JP | 2006-344602 A | 12/2006 |
| WO | 2006/059411 A1 | 6/2006 |

OTHER PUBLICATIONS

English translation of Official Communication issued in corresponding Chinese Patent Application No. 200880106607.0, mailed on May 25, 2011.
Official Communication issued in International Patent Application No. PCT/JP2008/058402, mailed on Jul. 22, 2008.

* cited by examiner

*Primary Examiner* — Thanh-Nhan P Nguyen
(74) *Attorney, Agent, or Firm* — Keating & Bennett, LLP

(57) ABSTRACT

A lighting device 12 for a display device of the present invention includes linear light sources 17 arranged in parallel, connectors 21 for feeding power to the linear light sources 17 and a chassis 14 for housing the linear light sources 17. The chassis 14 has fixing holes 30 for fixing the connectors 21. Each of the fixing holes 30 is formed in a longitudinal shape with its longitudinal direction along the parallel direction of the linear light sources 17. Each of the connectors 21 has a stopper 25 to be fitted in the chassis 14. When the stopper 25 is fitted in the fixing hole 30, the connector 21 is positioned and fitted in the fixing hole 30. The connectors 21 are fixable in a plurality of locations along the longitudinal direction of the fixing hole 30.

12 Claims, 12 Drawing Sheets

LIGHTING DEVICE FOR DISPLAY DEVICE, DISPLAY DEVICE AND TELEVISION RECEIVER

TECHNICAL FIELD

The present invention relates to a lighting device for a display device, a display device and a television receiver.

BACKGROUND ART

A liquid crystal panel used for a liquid crystal display device such as a liquid crystal television does not emit light itself. Therefore, it requires a backlight device as an external lamp. The backlight device is usually disposed behind the liquid crystal panel (i.e., on an opposite side from a display surface). The backlight device includes a metal or resin chassis, which is a housing, having an opening on a liquid crystal panel side. It also includes many fluorescent tubes (e.g., cold cathode tubes) housed in the chassis as lamps and many pieces of optical members (diffusing sheet and the like) disposed around the opening of the chassis for effectively transmitting light emitted from the lamps toward the liquid crystal panel side. Moreover, connectors may be provided in such a backlight device for connecting the lamps to an inverter. An example of a backlight device including such connectors is disclosed in Patent Document 1.
Patent Document 1: JP-A-2006-344602

PROBLEM TO BE SOLVED BY THE INVENTION

The backlight device disclosed in Patent Document 1 includes a housing, a plurality of lamps, lamp holders and a power supply board. Fixing holes are provided at a predetermined interval in the power supply board. The lamp holders are fitted in the fixing holes. Openings are provided in areas of a bottom plate of the housing that face the fixing holes of the power supply board. The lamp holders are inserted through the openings and housed in the housing. They are connected to the lamps.

The lamp holders are fixed in predetermined positions with the fixing holes and the openings provided in the power supply board and the housing, respectively. Therefore, soldering the lamp holders to the circuit board or leads for electrically connecting the connectors to the power supply board is not required. Thus, assembly of the backlight device is efficiently performed.

Because the openings are formed in predetermined locations in the bottom plate of the housing, only one pattern of arrangement of the lamp holders is available for one housing. Namely, one pattern of lamp holder arrangement is defined. Thus, the same housing cannot be used for lamps arranged in different patterns.

As a result, the housing needs to be designed and manufactured exclusively for each lamp arrangement pattern. Even if liquid crystal display televisions have the same size, different housings are required according to the arrangement patterns in the following cases in consideration of cost and performance: the number of lamps is different, the pattern of lamp arrangement is different, intervals of lamps are different in central areas and end areas of the arrangement (i.e., uneven lamp pitches). This is very inefficient and leads to an increase in cost.

DISCLOSURE OF THE PRESENT INVENTION

The present invention was made in view of the foregoing circumstances, and an object thereof is to provide a lighting device for a display device having a configuration that can accommodate different arrangement intervals of the light sources and contribute to cost saving. Another object of the present invention is to provide a display device having such a lighting device and a television receiver having such a display device.

MEANS FOR SOLVING THE PROBLEM

A lighting device for a display device of the present invention includes linear light sources arranged in parallel, connectors for feeding power to the linear light sources and a chassis for housing the linear light sources. The chassis has fixing holes for fixing the connectors. Each fixing hole is formed in a longitudinal shape such that a longitudinal direction thereof is along a parallel direction of the linear light sources. Each of the connectors has a stopper to be engaged in the chassis. The connector is positioned and engaged in the fixing hole by fitting the stopper in the fixing hole. The connectors are fixable in a plurality of locations in a longitudinal direction of the fixing hole.

According to such a lighting device for a display device, the connectors can be positioned and fixed only by fitting the stoppers in the fixing hole. Thus, time-consuming work such as soldering is not required during mounting of the connectors. Therefore, the efficiency in assembly work of the light device for a display device improves.

Moreover, the connectors are fixable in a plurality of locations in the longitudinal direction of the fixing hole formed in the chassis. Distances between the adjacent connectors can be set differently. The arrangement pattern of the connectors can be designed according to different arrangement patterns of the linear light sources. Thus, the same chassis can be used for linear light sources arranged at different intervals.

Even if liquid crystal display televisions have the same size, the number of linear light sources may be different, the pattern of linear light source arrangement may be different, intervals of linear light sources may be different in central areas and end areas of the arrangement (i.e., uneven lamp pitches). In known chassis, one fixing hole defines a fixing location of the connector and thus only one connector arrangement pattern is available. As a result, the chassis need to be designed and manufactured differently according to arrangement patterns of the linear light sources.

According to the present invention, the connector arrangement pattern can be changed in the same chassis. The connector fixing locations can be changed according to the arrangement pattern of the linear light sources. The same chassis can be used for different arrangement patterns for the linear light sources. This makes cost saving possible.

BEST MODE FOR CARRYING OUT THE INVENTION

Embodiment 1

Embodiment 1 of the present invention will be explained with reference to FIGS. 1 to 5. In this embodiment, a television receiver TV including a liquid crystal display device 10 is used as an example.

Figure 1:
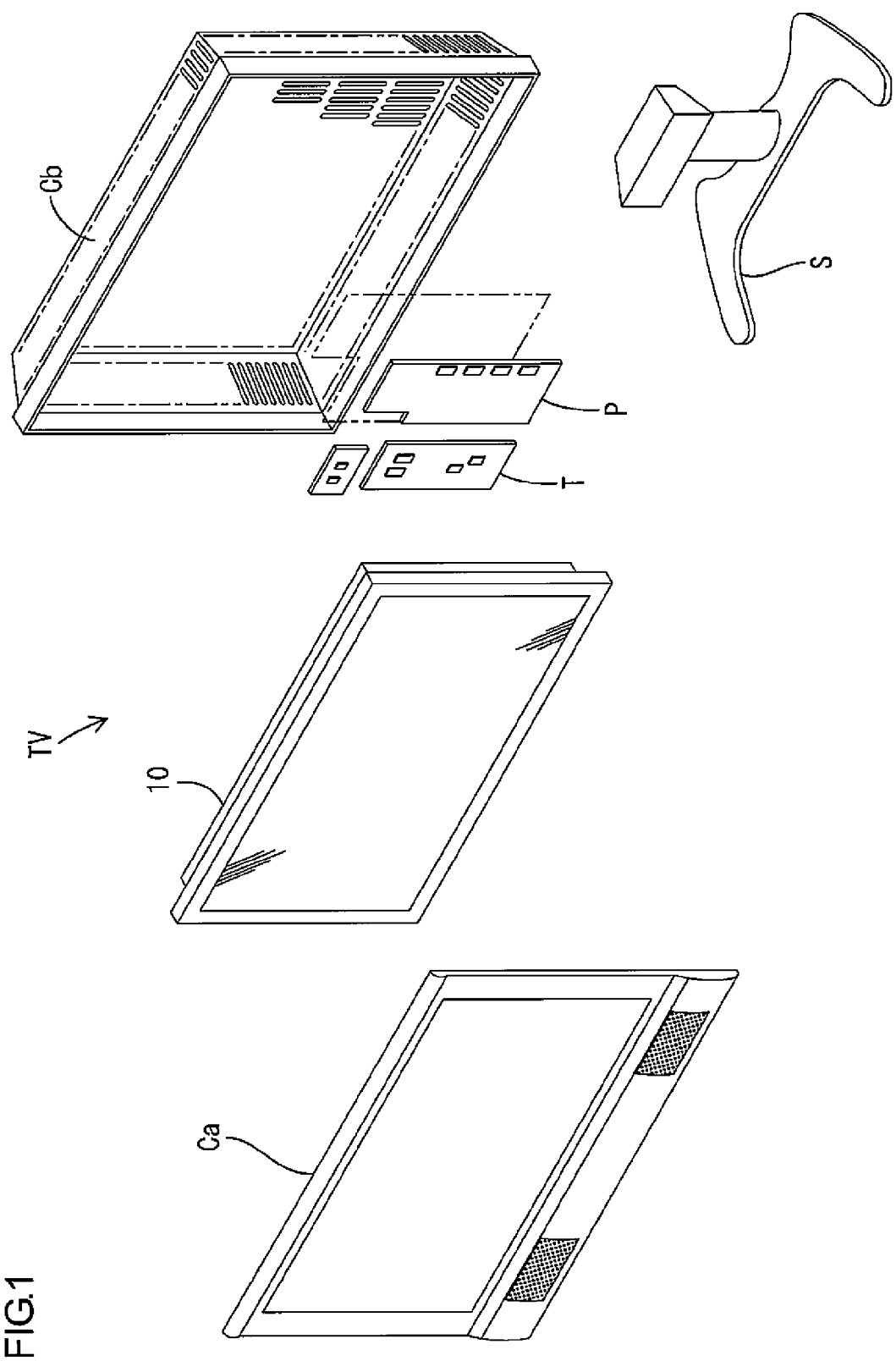
FIG. 1 is an exploded view illustrating the general construction of a television receiver according to embodiment 1 of the present invention.
Figure 2:
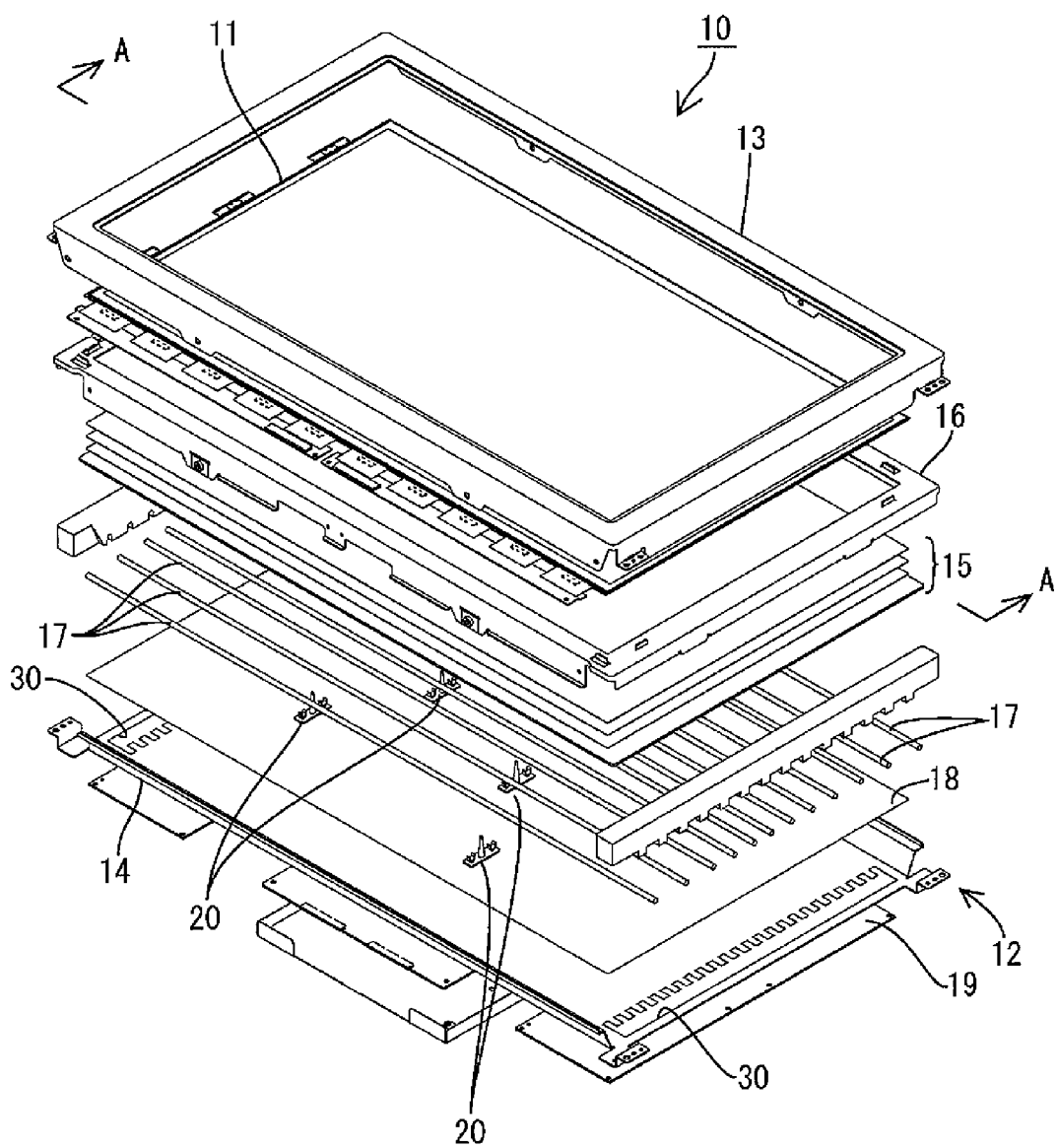
FIG. 2 is an exploded view illustrating the general construction of a liquid crystal display device included in the television receiver illustrated in FIG. 1.
Figure 3:
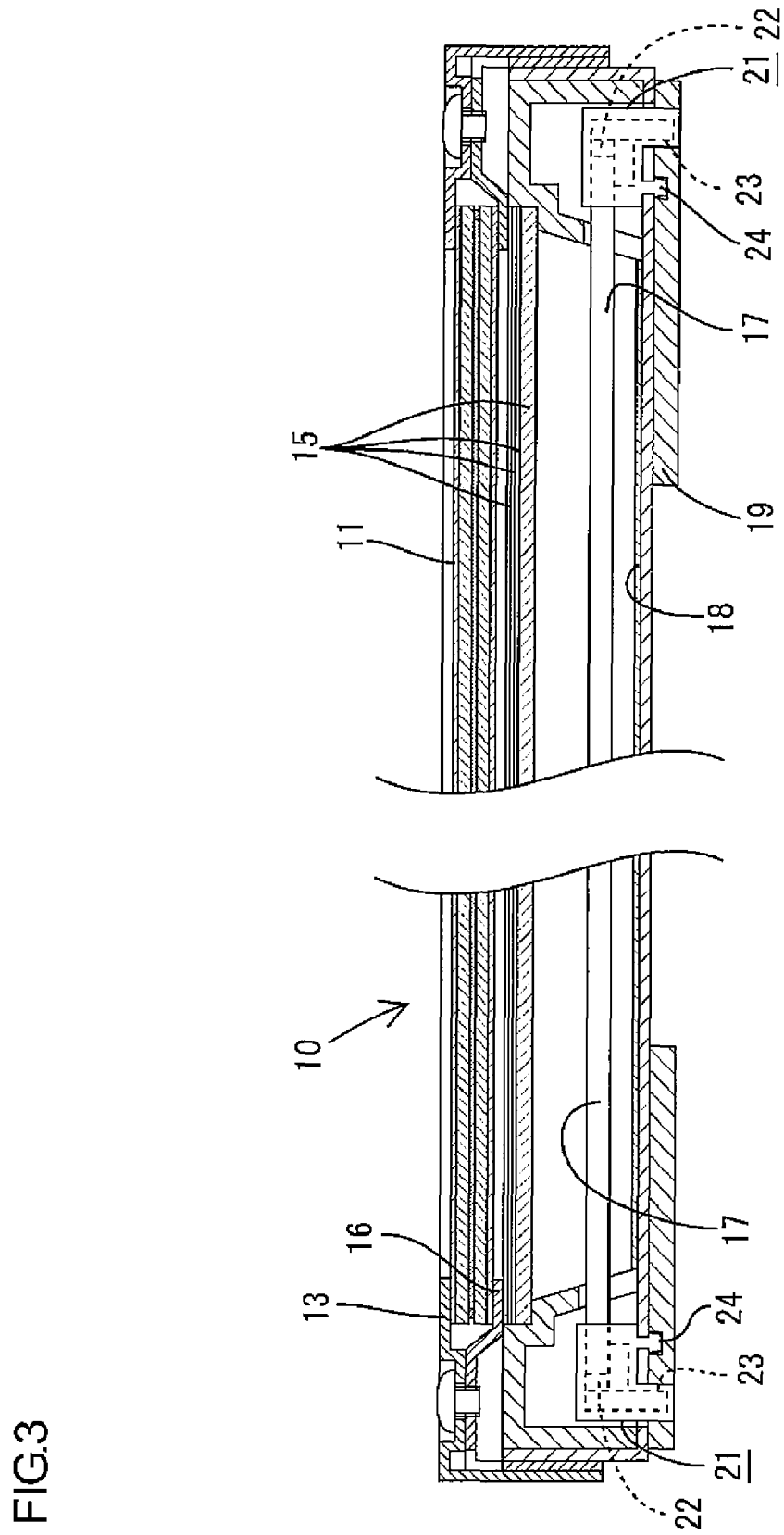
FIG. 3 is a cross-sectional view of the liquid crystal display device illustrated in FIG. 2 along the line A-A.
Figure 4:
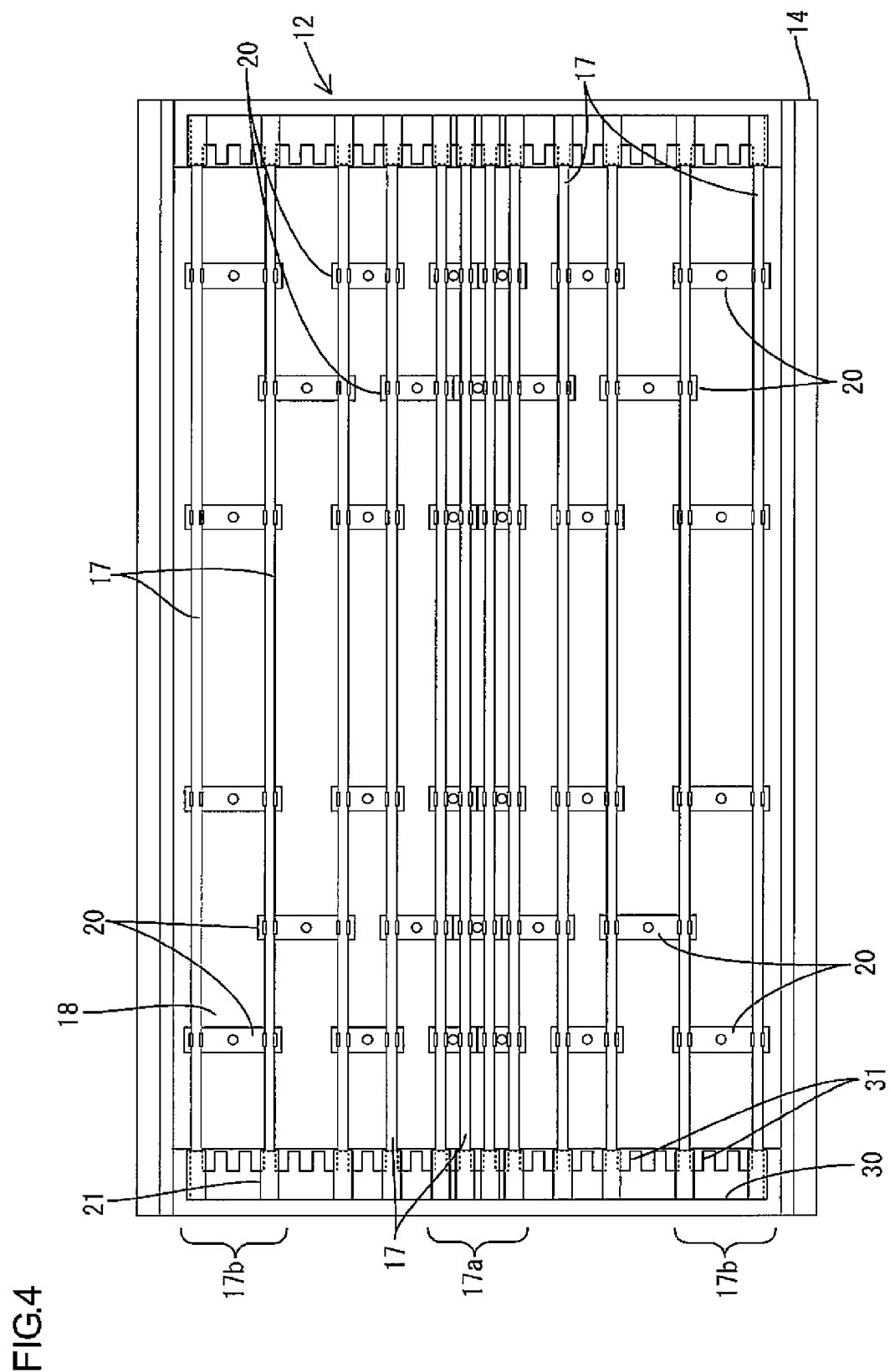
FIG. 4 is a plan view illustrating the general construction of a backlight device included in the liquid crystal display device.
Figure 5:
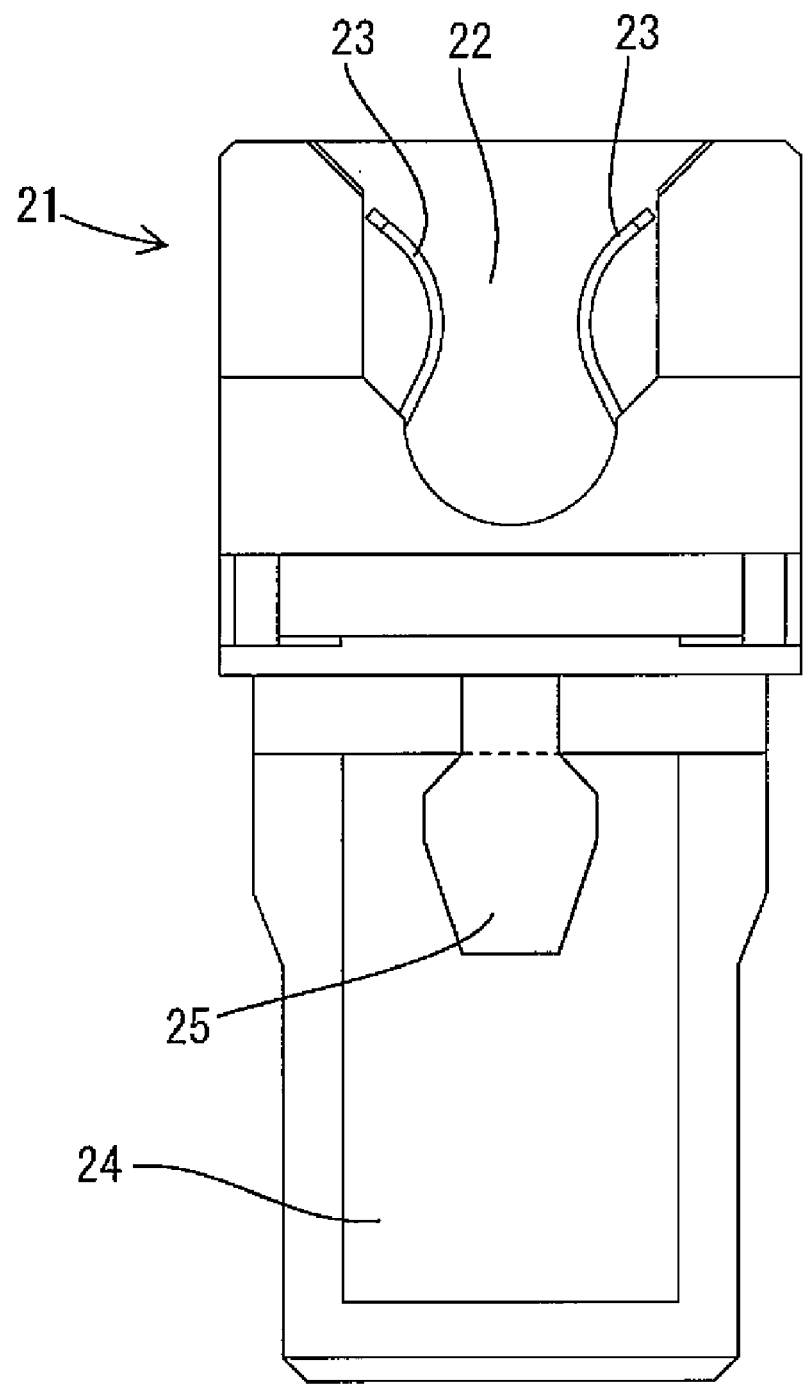
FIG. 5 is a front view illustrating the general construction of a connector included in the backlight device illustrated in FIG. 4.

FIG. 1 is an exploded view illustrating the general construction of a television receiver according to the present embodiment. FIG. 2 is an exploded view illustrating the general construction of a liquid crystal display device included in the television receiver illustrated in FIG. 1. FIG. 3 is a cross-sectional view of the liquid crystal display device illustrated in FIG. 2 along the line A-A. FIG. 4 is a plan view illustrating the general construction of a backlight device included in the liquid crystal display device. FIG. 5 is a front view illustrating the general construction of a connector included in the backlight device illustrated in FIG. 4.

The television receiver TV of the present embodiment, as illustrated in FIG. 1, includes the liquid crystal display device (display device) 10, front and rear cabinets Ca, Cb between which the liquid crystal display device 10 is sandwiched and housed, a power source P, a tuner T and a stand S. An overall shape of the liquid crystal display device 10 is a landscape-oriented rectangular. As illustrated in FIG. 2, it includes a liquid crystal panel 11, which is a display panel, and a backlight device 12, which is an external light source (lighting device for a display device). The backlight device 10 and the liquid crystal panel 11 are integrally held by a bezel 13 and the like.

Next, the liquid crystal panel 11 and the backlight device 12 that are included in the liquid crystal display device 10 will be explained (see FIGS. 2 and 3).

The liquid crystal panel 11 includes a pair of glass substrates that are bonded with a predetermined gap therebetween and liquid crystal sealed between the glass substrates. On one of the glass substrates, switching components (e.g., TFT) connected to source lines and gate line that are perpendicular to each other and pixel electrodes and the like are formed. On the other glass substrate, a counter electrode and color filters of red (R), green (G) and blue (B) are formed in matrix.

The backlight device 12, as illustrated in FIG. 2, is a so-called direct-light type backlight device. It includes a plurality of linear light sources (cold cathode tubes 17 are used as high-pressure discharge tubes here) arranged closely below an opposite surface of the liquid crystal panel 11 from the panel surface (i.e., display surface) and along the panel surface.

The backlight device 12 further includes a chassis 14, a plurality of optical members 15 (a diffuser plate, a diffusing sheet, a lens sheet and a reflection type polarizing plate, arranged in this order from the lower side of the drawings) and a frame 16. The chassis 14 is formed in a shallow substantially box-shape and an opening on the top. The optical members 15 are arranged so as to cover the opening of the backlight chassis 14. The frame 16 holds the optical members 15 to the backlight chassis 14. The cold cathode tubes 17 and lamp clips 20 are installed in the chassis 14. Furthermore, fixing holes 30 are formed in the chassis 14 along the short-side direction thereof for positioning and fixing connectors 21, which will be explained later. Inverter boards 19 are mounted to a surface of the chassis 14 on a side opposite from a side on which the cold cathode tubes 17 are arranged (i.e., outer surface) in longitudinal end areas of the chassis 14. A light emitting side of the backlight device 12 is a side closer to the optical member 15 than the cold cathode tube 17.

A light reflecting surface is formed on an inner surface side (or light source side) of the chassis 14 with light reflecting sheet 18. With the chassis 14 including such light reflecting sheet 18, light emitted from the cold cathode tubes 17 is reflected toward the optical members 15 including the diffuser plate.

The cold cathode tubes 17 are linear light sources that extend in one direction. They have an elongated tubular shape. A plurality of them (twelve tubes in FIG. 2) are housed in the chassis 14 such that their longitudinal direction (i.e., axial direction) matches the longitudinal direction of the chassis 14 and in parallel to each other. As illustrated in FIG. 4, the cold cathode tubes 17 are arranged at a relatively small interval in a narrow pitch area 17a and at a relatively large interval in wide pitch areas 17b. The narrow pitch area 17a is formed in a central section of the arrangement, that is, in a central section of the backlight device 12. The wide pitch areas 17b are formed in outer sections of the arrangement, that is, outer sections of the backlight device 12. The connectors 21 for feeding driving power to the cold cathode tubes 17 are connected to ends of each cold cathode tube 17.

Each connector 21 has, as illustrated in FIG. 5, a reception portion 22 that has openings on the front and the top in its upper part. The ends of the cold cathode tube 17 can be retained in the reception portion 22. Terminals 23 are formed by bending metal plates and arranged on both side surfaces of the reception portions 22. The terminals 23 are connected to the ends of the cold cathode tubes 17 in an electrically conductive condition.

A board connecting portion 24 and a stopper 25 are projected from the bottom surface of each connector 21. The stopper 25 is located on a side closer to the opening of the reception portion 22. The board connecting portion 24 is electrically connected to the terminals 23. When the connector 21 is mounted to the chassis 14, it is exposed on a surface of the chassis 14 located on an opposite side on which the cold cathode tubes 17 are arranged (i.e., outer surface) through the fixing hole 30 of the chassis 14. Then, it is connected to the inverter board 19 mounted on the outer surface (see FIG. 3). Power for driving the cold cathode tubes 17 are supplied from the inverter boards 19 to the cold cathode tubes 17 via the board connecting portions 24 and the terminals 23.

The stopper 25 is made of resin and its lower portion have bulges to prevent from falling off. By fitting (or pushing) the stopper 25 in the fixing hole 30 of the chassis 14, more specifically in a cutout 31, which will be explained later, the connector 21 is engaged in the fixing hole 30, that is, fixed to the chassis 14.

The fixing holes 30 are formed at ends of the longitudinal direction of the chassis 14, as illustrated in FIG. 4. Each of them is formed as a continuous hole that extends from the one end of arrangement of the cold cathode tubes 17 that are arranged in parallel to the other end. Namely, the fixing hole 30 has a longitudinal shape along the parallel direction of the cold cathode tubes 17. A number of rectangular cutouts 31 (24 of them in FIG. 4) are formed at an equal interval along the long side of the fixing hole 30 on the cold cathode tube 17 side (on the center side of the chassis 14).

By fitting the stopper 25 projecting from the bottom surface of the connector 21 in the cutout 31, it is positioned and engaged in the fixing hole 30. Namely, the connector 21 can be engaged in the preferable cutout among the cutouts 31 formed in the longitudinal direction of the fixing hole 30. Thus, different locations (the maximum of 24 different locations in this embodiment) are available for fixing the connector 21. Namely, the locations in which the connectors 21 are fixed can be changed according to the arrangement pattern of the cold cathode tubes 17.

In this embodiment, the central area of the arrangement pattern of the cold cathode tubes 17 is the narrow pitch area 17a and the end areas are the wide pitch areas 17b. The connectors 21 are fixed as follows according to the arrangement pattern of the cold cathode tubes 17.

As illustrated in FIG. 4, for example, the connectors 21 are engaged in the adjacent cutouts 31 in the narrow pitch area 17a (central area in the short-side direction of the backlight device 12) to arrange the connectors 21 at a small interval, and connected to the cold cathode tubes 17.

Outside the narrow pitch areas 17a, that is, in areas in which the arrangement interval is relatively larger than that in the narrow pitch area 17a, the connectors 21 are engaged in the cutouts 31 such that one cutout 31 in which the connectors 21 is not engaged remains between connectors 21 (that is, every other cutout 31 is used). As a result, the connectors 21 are arranged at a relatively large interval and connected to the cold cathode tubes 17.

In the wide pitch areas, which are further outer areas (end areas in the short-side direction of the backlight device 12), the connectors 21 are engaged in the cutouts 31 such that two cutouts 31 in which the connectors 21 are not engaged remain between the connectors 21 (that is, one cutout 31 in every three is used). The connectors 21 are arranged at an even larger interval and connected to the cold cathode tubes 17.

The television receiver TV, the liquid crystal display device 10 and the backlight device 12 of the present embodiment having the above configuration provides the following operational effects.

The backlight device 12 of the present embodiment has the fixing holes 30 having longitudinal shapes that extend in the parallel direction of the cold cathode tubes 17 and connectors 21 that can be fixed only by fitting the stoppers 25 projecting from the bottom surfaces of the connectors 21 in the fixing holes 30. Therefore, time-consuming work such as soldering is not required during mounting of the connectors 21 and thus the efficiency in assembly work of the backlight device 12 improves.

The connectors 21 are fixable in different locations (the maximum of 24 locations in this embodiment) in the longitudinal direction of the fixing holes 30 formed in the chassis 14. Namely, a variety of combinations of intervals between adjacent connectors 21 are possible. Locations to fix the connectors 21 can be changed according to the arrangement patterns of the cold cathode tubes 17. For example, even when the cold cathode tubes 17 are arranged with different pitches in the narrow pitch area 17a and the wide pitch area 17b, the same chassis 14 can be still used by changing fixing locations of the connectors 21. Thus, cost saving is possible.

In this embodiment, each fixing hole 30 is formed as a single continuous hole that extends in the parallel direction of the cold cathode tubes 17. Each connector 21 can be engaged in a preferable location along the longitudinal direction of the continuous hole.

By forming each fixing hole 30 as a single longitudinal continuous hole, each connector 21 can be positioned with high flexibility according to the arrangement intervals of the cold cathode tubes 17. Therefore, the chassis 14 can accommodate a variety of arrangement patterns of the cold cathode tubes 17.

In this embodiment, a plurality of cutouts 31 formed in the longitudinal direction of each fixing hole 30. When the stopper 25 is fitted in the cutout 31, the connector 21 is positioned and fixed.

By selecting preferable cutouts 31 and fitting the stoppers therein, the intervals between the adjacent connectors 21 can be set preferably. Moreover, the cutouts 31 are used as origins for positioning the connectors 21. Thus, the connectors 21 are precisely positioned and fixed.

In this embodiment, a plurality of cold cathode tubes 17 are arranged in parallel. The narrow pitch area 17a in which their arrangement interval is relatively small is located in a central area of the arrangement. The wide pitch areas 17b in which their arrangement interval is relatively large are located in end areas of the arrangement.

By setting the narrow pitch area 17a of the cold cathode tubes 17 in the central area of the arrangement, the luminance of light provided by the backlight device 12 can be increased in the central area of the arrangement. As a result, visibility on the display surface of the liquid crystal display device 10 and the television receiver TV improves.

Furthermore, even when the cold cathode tubes 17 are arranged at a large interval in some part and at a small interval in another part, the connectors 21 can be fixed in preferable locations along the longitudinal direction of the fixing hole 30. Therefore, the same chassis 14 can be still used and the cost for the backlight 12 can be reduced.

Embodiment 2

Next, embodiment 2 of the present invention will be explained with reference to FIGS. 6 and 7. In embodiment 2, the configuration of the connectors and the arrangement patterns of cold cathode tubes are different. Other configurations are the same as the previous embodiment. The same parts as the previous embodiment are indicated with the same symbols and will not be explained.

Figure 6:
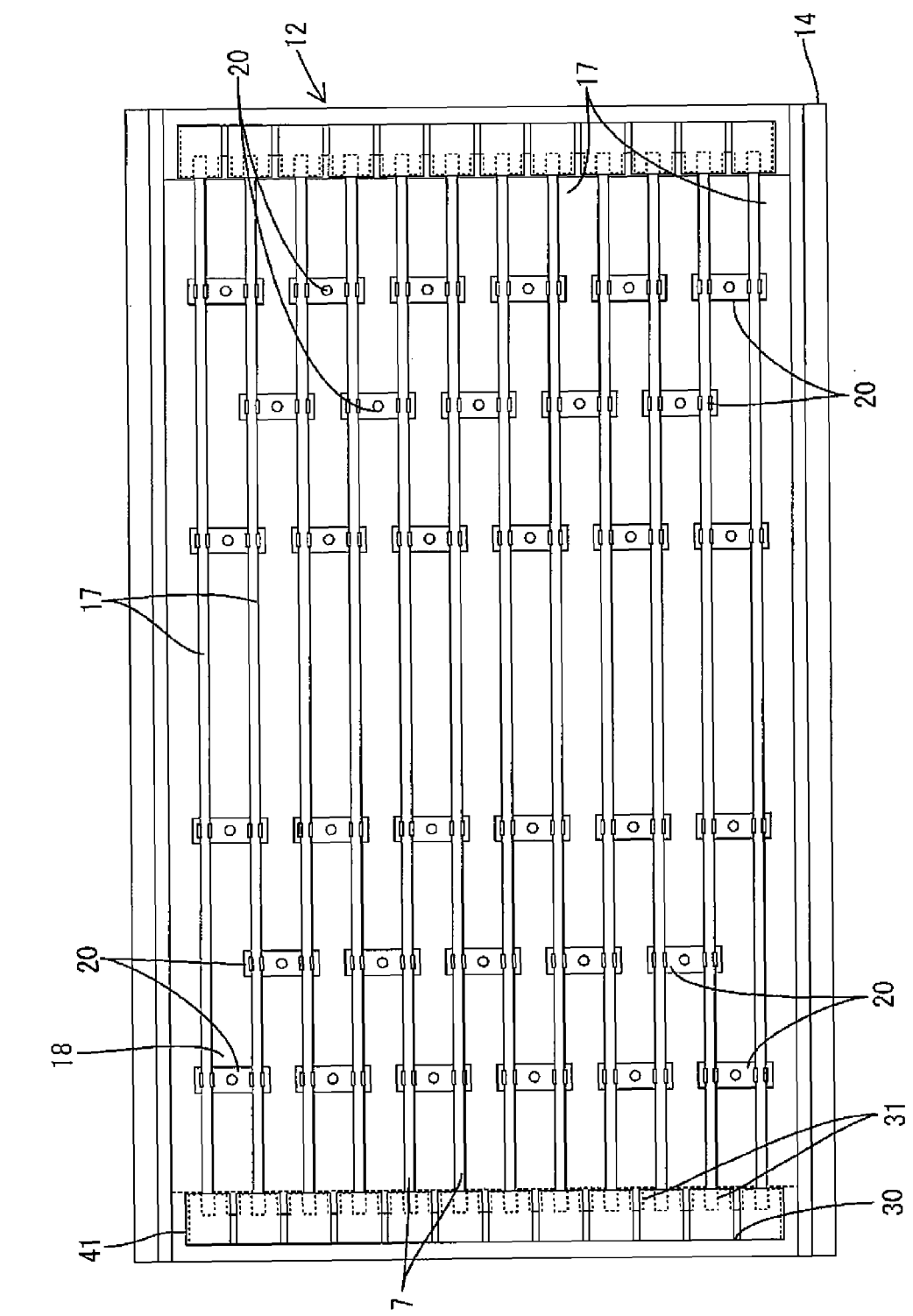
FIG. 6 is a plan view illustrating the construction of the backlight device according to embodiment 2 of the present invention.

FIG. 6 is a plan view illustrating the construction of the backlight device according to the present embodiment. FIG. 7 is a front view illustrating the general construction of a connector included in the backlight device illustrated in FIG. 6.

Each cold cathode tube 17, as illustrated in FIG. 6, has a longitudinal tubular shape. A plurality of the cold cathode tubes 17 (twelve tubes in FIG. 6) are arranged in parallel to each other so as to match their longitudinal direction (or their axial direction) with the longitudinal direction of the chassis 14, and housed in the chassis 14. Especially in this embodiment, all cold cathode tubes 17 are arranged in parallel at an equal interval. Connectors 41 for feeding driving power to respective cold cathode tubes are connected to ends of respective cold cathode tubes 17.

Figure 7:
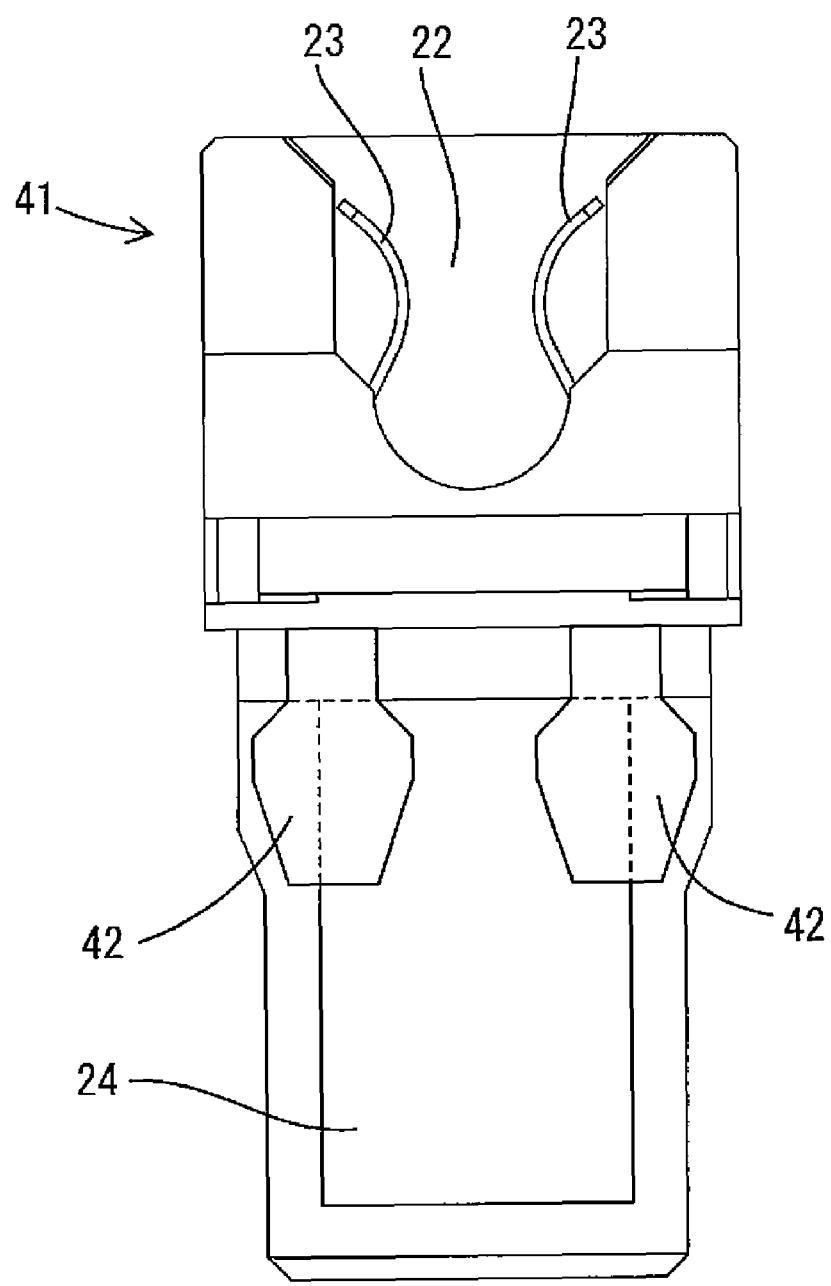
FIG. 7 is a front view illustrating the general construction of a connector included in the backlight device illustrated in FIG. 6.

Each connector, as illustrated in FIG. 7, includes a reception portion 22 that has an opening in its upper part for receiving the end of the cold cathode tube 17 and terminals 23 to be connected to the end of the cold cathode tubes 17 in an electrically conductive condition. A board connecting portion 24 and two stoppers 42 are projected from the bottom surface of the connector 41. A distance between two stoppers 42 is the same as the distance between the cutouts 31 of the fixing hole 30 formed in the chassis 14.

Each fixing hole 30 is, as illustrated in FIG. 6, formed as a continuous hole that extends in the longitudinal direction of the parallel direction of the cold cathode tubes 17. A number of rectangular cutouts 31 (24 of them in FIG. 4) are formed at an equal interval along the long side of each fixing hole 30 on the cold cathode tube 17 side (on the center side of the chassis 14). By fitting the stoppers 42, 42 in adjacent cutouts 31, the connector 41 is positioned and engaged in the fixing hole 30 and the connectors 21 are positioned and fixed at an equal interval. Namely, the connectors 21 are also positioned and fixed at an equal interval to connect to the cold cathode tubes 17 that are arranged at an equal interval.

In this embodiment, the cutouts 31 are formed at an equal interval in the longitudinal direction of the fixing hole 30.

By forming the cutouts 31 at an equal interval, each connector 41 can be engaged in a preferable location in the fixing hole 30 with the two stoppers 42 engaged in the adjacent cutouts 31. In this case, the connector 41 is engaged in two parts, which provides high level of fixing strength, and therefore problems such as coming off of the connector are less likely to occur.

In this embodiment, a plurality of cold cathode tubes 17 are arranged in parallel at an equal interval.

Even when the cold cathode tubes 17 are arranged at an equal interval, the cold cathode tubes 17 can be connected to the connectors 41 only by changing the configuration of the stopper 42 of each connector 41 or selecting appropriate cutouts 31 for fixing the connector 41. Thus, the same chassis 14 can be used and this contributes to cost saving.

Embodiment 3

Figure 8:
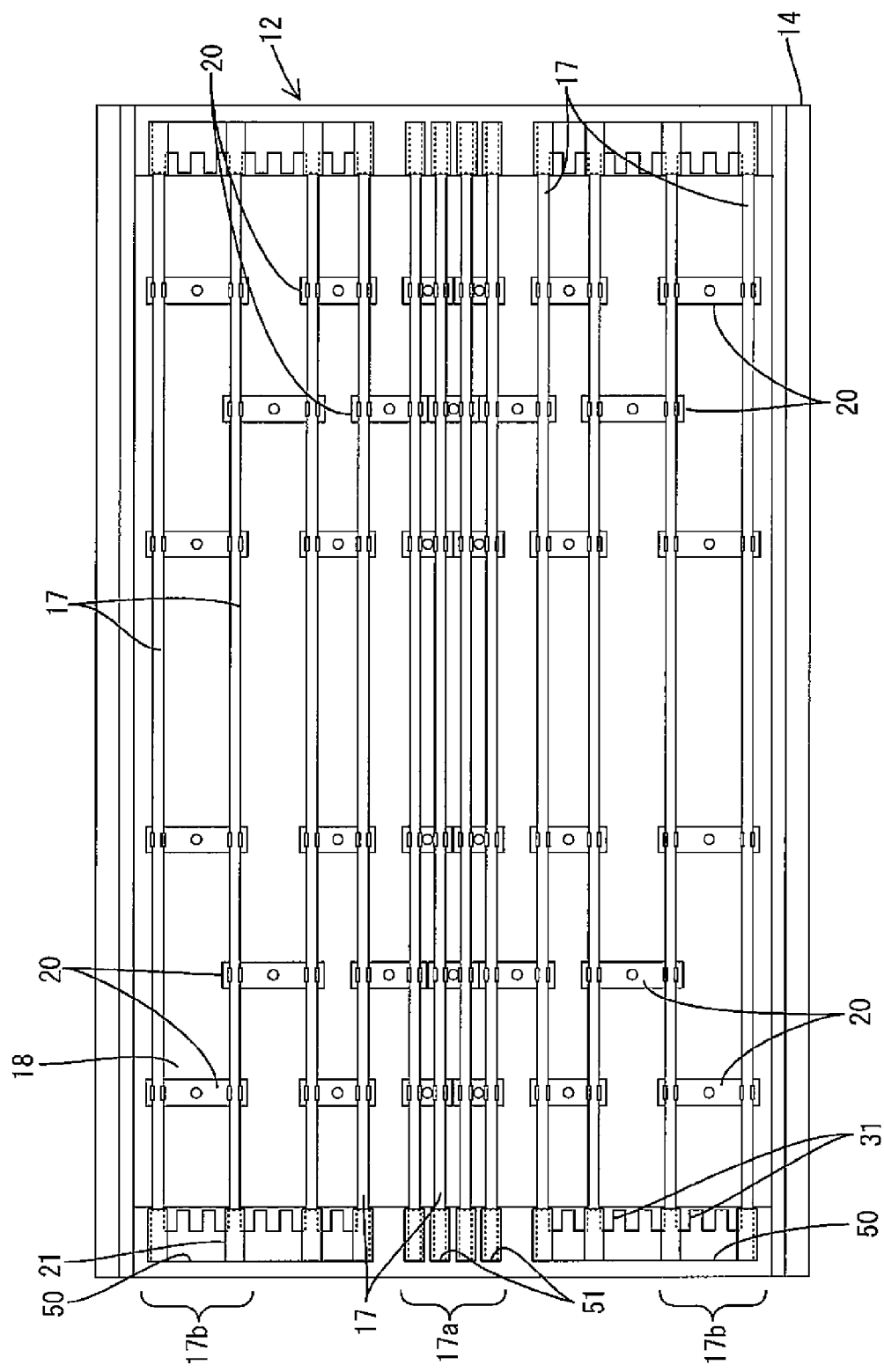
FIG. 8 is a plan view illustrating the construction of the backlight device according to embodiment 3 of the present invention.

Embodiment 3 of the present invention will be explained with reference to FIG. 8. In embodiment 3, the configuration of the fixing holes is different. Other configurations are the same as the previous embodiment. The same parts as the previous embodiment are indicated with the same symbols and will not be explained. FIG. 8 is a plan view illustrating the construction of the backlight device according to the present embodiment.

The cold cathode tubes 17 are, as illustrated in FIG. 8, arranged at a small interval in the narrow pitch area 17a in which the arrangement interval is relatively small, and at a large interval in the wide pitch areas 17b in which the arrangement interval is relatively large. The narrow pitch area 17a is located in the central area of the arrangement of the cold cathode tubes 17, that is, in the central area of the backlight device 12. The wide pitch areas are located in the end areas of the arrangement of the cold cathode tubes 17, that is, in the outer areas of the backlight device 12.

Fixing holes 50 and individual fixing holes 51 for fixing the connectors 21 to be connected to the cold cathode tubes 17 are formed in longitudinal end areas of the chassis 14. The fixing holes 50 are formed in the end areas of the arrangement of the cold cathode tubes 17 that are arranged in parallel. They are continuous holes that extend longitudinally in the parallel direction of the cold cathode tubes 17. The connectors 21 can be engaged in preferable locations in the fixing holes 50. The individual fixing holes 51 are formed in the central area of the arrangement of the cold cathode tubes 17 that are arranged in parallel. Each of them is formed individually. Only one connector 21 can be engaged in a single individual fixing hole 51 and thus a location in which the connector 21 is fixed is strictly defined.

In this embodiment, the fixing holes 50 formed in the end areas of the arrangement of the cold cathode tubes 17 that are arranged in parallel as continuous holes that extend in the parallel direction of the cold cathode tubes 17.

In view of display visibility, the luminance of the backlight device 12 may be increased in the central area of the display surface, that is, in the central area of the arrangement of the cold cathode tubes 17. For that reason, means for increasing arrangement intervals in end areas of the arrangement of the cold cathode tubes 17 may be used. By forming the fixing holes 50 in end areas of the arrangement of the cold cathode tubes 17 that are arranged in parallel as longitudinal continuous holes, the connectors 21 can be engaged in preferable locations. The backlight device 12 can accommodate variations in arrangement intervals of the cold cathode tubes 17 in the end areas of the arrangement.

Other Embodiment

The present invention is not limited to the embodiments explained in the above description made with reference to the drawings. The following embodiments may be included in the technical scope of the present invention, for example.

Figure 9:
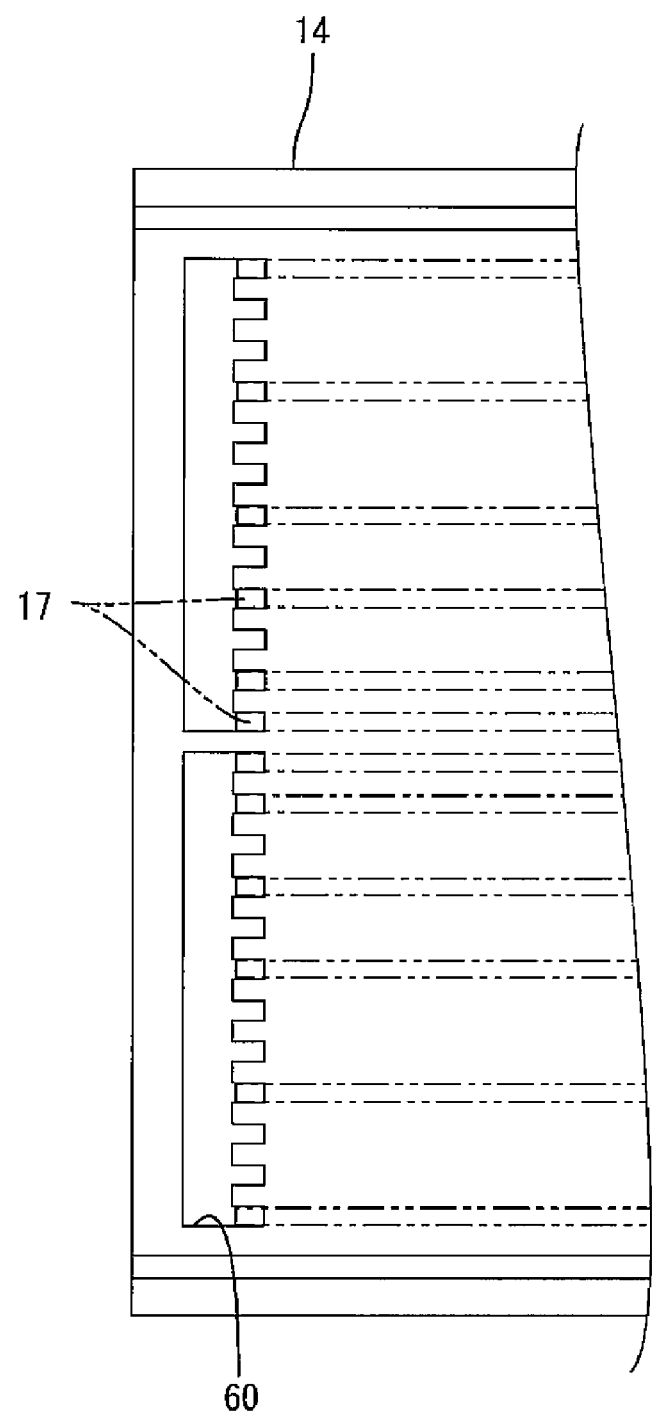
FIG. 9 is a plan view illustrating a modified embodiment of fixing holes according to the present invention.
Figure 10:
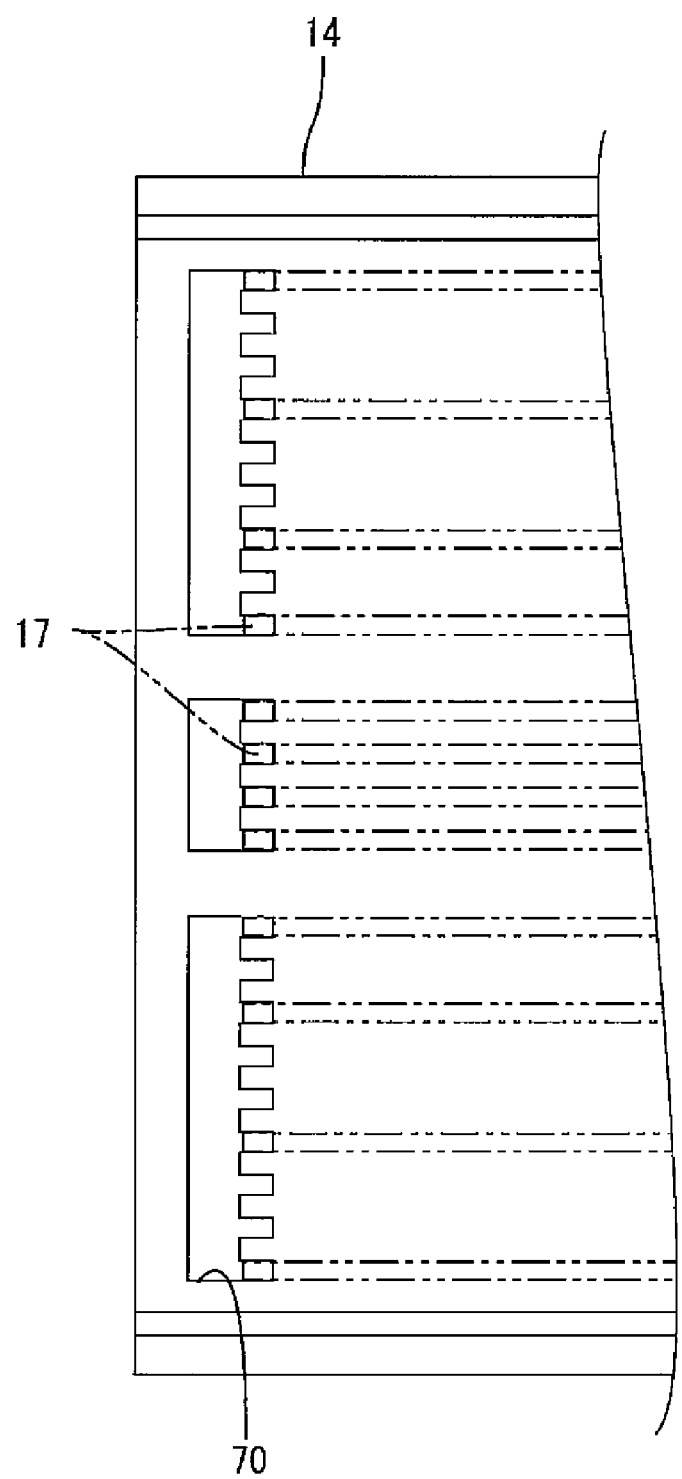
FIG. 10 is a plan view illustrating a modified embodiment of fixing holes according to the present invention.

(1) In the above embodiment 1, each fixing hole 30 is a single continuous hole that extends in the parallel direction of the cold cathode tubes 17. However, it may be formed as two continuous holes in series such as fixing holes 60 illustrated in FIG. 9. Moreover, it may be formed as three continuous holes in series such as fixing holes 70 illustrated in FIG. 10. By forming a plurality of fixing holes, reduction in strength of the chassis 14 is less likely to occur. Furthermore, intervals at which the connectors are fixed are adjustable for each continuous hole.

Figure 11:
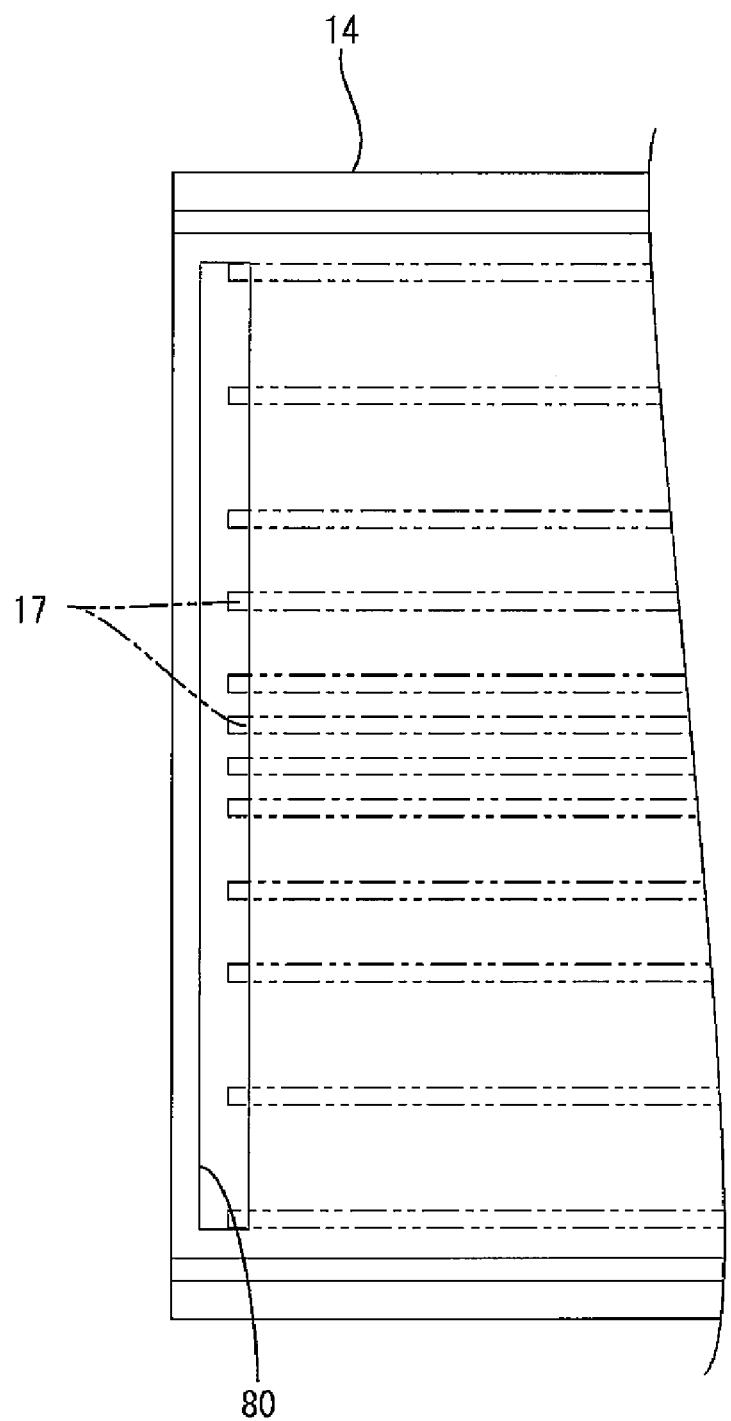
FIG. 11 is a plan view illustrating a modified embodiment of fixing holes according to the present invention.

(2) In the above embodiments, a plurality of cutouts 31 are formed along the longitudinal direction of the fixing holes 30. However, the cutouts 31 are not always necessary. For example, fixing holes may be formed in a rectangular shape as illustrated in FIG. 11.

Figure 12:
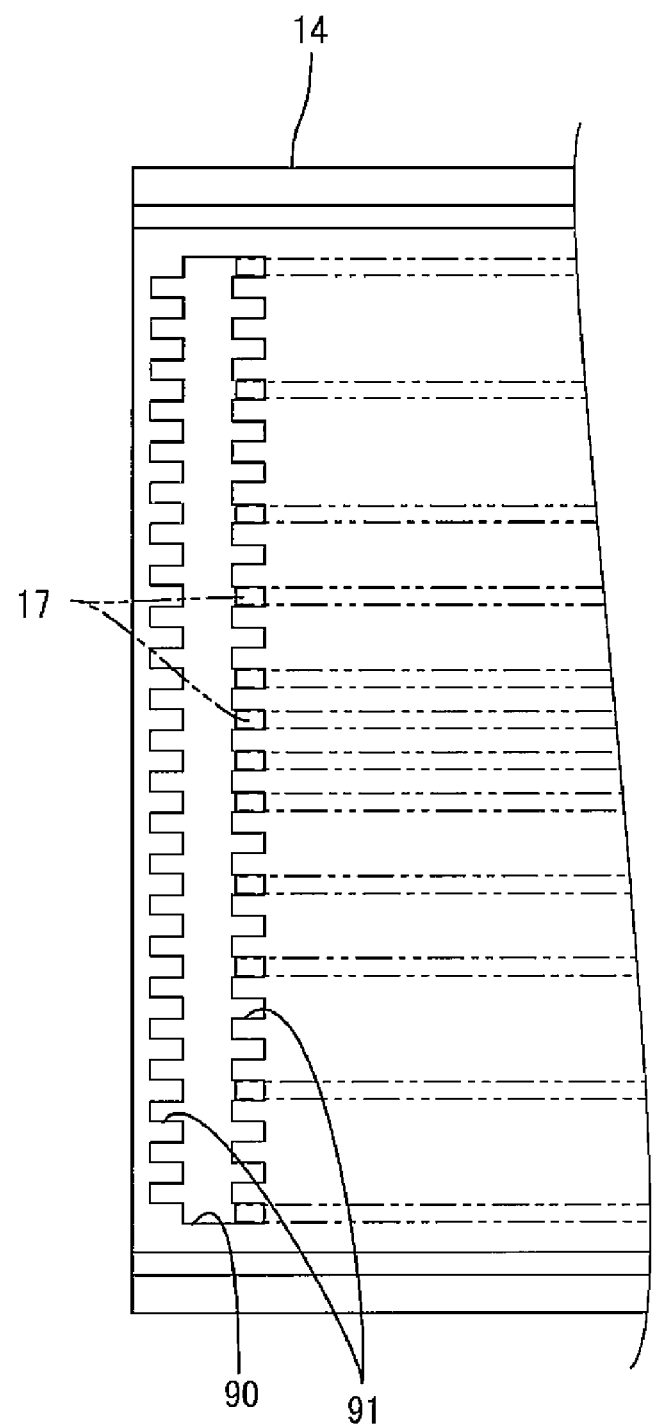
FIG. 12 is a plan view illustrating a modified embodiment of fixing holes according to the present invention.

(3) In the above embodiments, the cutouts 31 are formed along the long side of the fixing holes 30 on the cold cathode tube 17 side (in the central area of the chassis 14). However, cutouts 91 illustrated in FIG. 12 may be formed along both long sides of each fixing hole 90. In this case, by forming the cutouts 91 along one longitudinal side shifted from the cutouts 91 formed on the other side, the backlight device 12 can accommodate more variations in arrangement patterns of the cold cathode tubes 17.

(4) In the above embodiments, one cold cathode tube 17 is connected to one connector. However, two or more cold cathode tubes 17 may be connected to one connector.

(5) In the above embodiments, the cold cathode tubes 17 are used as linear light sources. However, other linear light sources such as hot cathode tubes may be used for the present invention.

(6) In the above embodiments, the liquid crystal display device using a liquid crystal panel as a display panel is used. However, the present invention can be applied to a display device using other types of display panels.

The invention claimed is:

1. A lighting device for a display device, comprising:
   linear light sources arranged in parallel;
   connectors for feeding power to said linear light sources; and
   a chassis for housing said linear light sources, wherein:
   said chassis includes at least one fixing hole and a plurality of cutouts arranged to fix said connectors;
   said fixing hole has a longitudinal shape extending along a side of said chassis for a length of an arrangement area of a plurality of said linear light sources such that a longitudinal direction thereof is along a parallel direction of said linear light sources;
   said cutouts are arranged along a long side edge of the fixing hole continuously from said fixing hole;
   each of said connectors includes a stopper to be engaged in said chassis;
   each of said connectors is positioned and engaged in a respective one of said cutouts due to said stopper being fitted in said respective one of said cutouts; and
   said connectors are fixable in a plurality of locations along a longitudinal direction of said fixing hole.

2. A lighting device for a display device, as in claim 1, wherein:
   said fixing hole is formed as a single continuous hole that extends in the parallel direction of said linear light sources; and
   each of said connectors connected to each of said linear light sources that are arranged in parallel is fixable in a preferable location along the longitudinal direction of the continuous hole.

3. A lighting device for a display device, as in claim 1, wherein:
   said fixing hole is formed as a plurality of continuous holes in series along the parallel direction of said linear light sources; and
   each of the connectors connected to each of said linear light sources that are arranged in parallel is fixable in a preferable location along the longitudinal direction of the continuous hole.

4. A lighting device for a display device, as in claim 1, said chassis includes a plurality of fixing holes, wherein at least one of said plurality of fixing holes located in an end area of the arrangement area of said linear light sources that are arranged in parallel is formed as a continuous hole that extends in the parallel direction of said linear light sources.

5. A lighting device for a display device, as in claim 1, wherein the plurality of cutouts is formed along the longitudinal direction of said fixing hole.

6. A lighting device for a display device, as in claim 5, wherein said cutouts are formed at an equal interval.

7. A lighting device for a display device, as in claim 1, wherein said linear light sources are arranged at a relatively small interval in a narrow pitch area and at a relatively large interval in a wide pitch area.

8. A lighting device for a display device, as in claim 1, wherein said narrow pitch area is located in a central area of arrangement of the linear light sources and said wide pitch area is located in an end area of arrangement of the linear light sources.

9. A display device comprising:
   a lighting device for a display device, as in claim 1; and
   a display panel for providing display by use of light from said lighting device for a display device.

10. A display device as in claim 9, wherein said display panel is a liquid crystal panel that uses liquid crystal.

11. A television receiver comprising a display device as in claim 9.

12. The lighting device for a display device as in claim 1, wherein said cutouts are arranged along two long side edges of said fixing hole continuously from said fixing hole such that said cutouts along one of said two long side edges are shifted from said cutouts along the other one of said two long side edges.

* * * * *